US012794864B2

(12) United States Patent
Rasoamiaramanana et al.

(10) Patent No.: US 12,794,864 B2
(45) Date of Patent: Nov. 10, 2026

(54) SECURE METHOD FOR DATA EXCHANGE BETWEEN A TERMINAL AND A SERVER

(71) Applicant: Orange, Issy-les-Moulineaux (FR)

(72) Inventors: Sandra Rasoamiaramanana, Châtillon Cedex (FR); Gilles Macario-Rat, Châtillon Cedex (FR); Marine Minier, Vandœuvre-lès-Nancy (FR)

(73) Assignee: ORANGE, Issy-les-Moulineaux (FR)

( * ) Notice: Subject to any disclaimer, the term of this patent is extended or adjusted under 35 U.S.C. 154(b) by 458 days.

(21) Appl. No.: 17/777,906

(22) PCT Filed: Nov. 19, 2020

(86) PCT No.: PCT/FR2020/052130
§ 371 (c)(1),
(2) Date: May 18, 2022

(87) PCT Pub. No.: WO2021/099744
PCT Pub. Date: May 27, 2021

(65) Prior Publication Data

US 2023/0025166 A1 Jan. 26, 2023

(30) Foreign Application Priority Data

Nov. 22, 2019 (FR) ..................................... 19 13104

(51) Int. Cl.
*H04L 9/40* (2022.01)
*H04L 9/32* (2006.01)

(52) U.S. Cl.
CPC ........ *H04L 63/0435* (2013.01); *H04L 9/3278* (2013.01)

(58) Field of Classification Search
CPC ... G09C 1/00; H04L 2209/16; H04L 2209/80; H04L 63/0435; H04L 9/0637; H04L 9/3278
See application file for complete search history.

(56) References Cited

U.S. PATENT DOCUMENTS 9,806,883 B2 * 10/2017 Falk ...................... H04L 9/0866
10,140,612 B1 * 11/2018 Murray ...................... H04L 9/30
10,511,436 B1 * 12/2019 Machani ................. H04L 9/085
10,812,269 B2 * 10/2020 Medvinsky ........... H04L 9/3226
2009/0158051 A1 6/2009 Michiels et al.
(Continued)

FOREIGN PATENT DOCUMENTS

EP 2326043 A1 5/2011

OTHER PUBLICATIONS

International Search Report and Written Opinion dated Mar. 1, 2021 for Application No. PCT/FR2020/052130.
(Continued)

*Primary Examiner* — Gary S Gracia
(74) *Attorney, Agent, or Firm* — Knobbe, Martens, Olson & Bear, LLP

(57) ABSTRACT

A secure method for data exchange between a terminal and a server is described. The server can use a cryptographic module configured to encrypt or decrypt a message based on input parameters comprising the message, a response to a challenge and a symmetric key. The terminal can use a white-box cryptography module constituting a white-box implementation of the cryptographic module of the server for this symmetric key.

9 Claims, 3 Drawing Sheets

(56) References Cited

U.S. PATENT DOCUMENTS

| | | | | |
|---|---|---|---|---|
| 2012/0331293 | A1* | 12/2012 | Ma | H04N 21/4627 713/168 |
| 2015/0012737 | A1* | 1/2015 | Newell | G06F 21/44 713/2 |
| 2015/0134966 | A1* | 5/2015 | Wallrabenstein | G09C 1/00 713/174 |
| 2015/0324302 | A1* | 11/2015 | Lee | H04L 9/08 713/193 |
| 2017/0346629 | A1* | 11/2017 | Moon | H04L 9/30 |
| 2018/0167197 | A1* | 6/2018 | Anderson | H04L 9/002 |
| 2019/0140834 | A1* | 5/2019 | Medvinsky | H04L 9/3234 |
| 2019/0299932 | A1* | 10/2019 | Porteret | G07C 9/00563 |
| 2020/0028693 | A1* | 1/2020 | Wu | H04L 9/3263 |
| 2021/0036873 | A1* | 2/2021 | Kim | H04L 9/3278 |
| 2023/0025166 | A1* | 1/2023 | Rasoamiaramanana | H04L 63/0435 |

OTHER PUBLICATIONS

Rasoamiaramanana Sandra et al. White-Box Traitor-Tracing from Tardos Probabilistic Codes. 12th European Conference on Computer Vision. ECCV 2012; [Lecture Notes in Computer Science]. pp. 125-141. Mar. 16, 2013 (Mar. 16, 2013).

* cited by examiner

SECURE METHOD FOR DATA EXCHANGE BETWEEN A TERMINAL AND A SERVER

RELATED APPLICATIONS

This application is the U.S. National Phase of Application No. PCT/FR2020/052130 entitled "SECURE METHOD FOR DATA EXCHANGE BETWEEN A TERMINAL AND A SERVER" and filed Nov. 19, 2020, which claims the benefit of French Patent Application No. 19 13104, filed Nov. 22, 2019, each of which is incorporated by reference in its entirety.

The present invention lies in the field of the secure exchange of data in a telecommunications network.

In the current state of the art, it is usual, to guarantee the confidentiality of the exchanges, that the emitter encrypts the data with a cryptographic key before sending them into the network, the receiver comprising cryptographic means for decrypting the data received with a key identical or compatible with that of the emitter.

These widespread mechanisms have a significant fragility if the cryptographic keys of a device can be obtained by a malicious third party by directly attacking the equipment or by monitoring its execution.

The invention aims at a secure method for exchanging data that is less vulnerable than those of the prior art.

The invention therefore aims at a new secure mechanism for exchanging data between two devices.

It is presented below for a secure exchange between a terminal and a server, but it could be applied to other equipment when one of these two pieces of equipment is less vulnerable to attacks than the other of these two pieces of equipment. More specifically, the terminal is considered untrusted.

More specifically, and according to a first aspect, the invention relates to a method for providing a white-box cryptography module.

This method is implemented by a server comprising a cryptographic module configured to encrypt or decrypt a message based on input parameters comprising said message, a symmetric key and a response to a challenge. Said method comprises:

- a step of obtaining a symmetric key for a terminal;
- a step of generating a white-box cryptography module, said white-box cryptography module being a white-box implementation of the cryptographic module of the server for said symmetric key obtained for this terminal, said white-box cryptography module being configured to encrypt or decrypt a message from said symmetric key buried in this module and input parameters comprising a message and a response to a challenge; and
- a step of providing said white-box cryptography module to said terminal.

Correlatively, the Invention Relates to a Server Comprising:

- a cryptographic module configured to encrypt or decrypt a message based on input parameters comprising said message, a response to a challenge and a symmetric key,
- a module for obtaining a symmetric key for a terminal;
- a module for generating a white-box cryptography module, said white-box cryptography module being a white-box implementation of said cryptographic module of the server for said symmetric key obtained for this terminal, said white-box cryptography module being configured to encrypt or decrypt a message from said symmetric key buried in this module and input parameters comprising a message and a response to a challenge, and
- a module for providing said white-box cryptography module to said terminal.

According to a second aspect, the invention relates to a method for obtaining a white-box cryptography module. This method is implemented by a terminal. It comprises:

- a step of sending an identifier of the terminal to a server comprising a cryptographic module configured to encrypt or decrypt a message based on input parameters comprising said message, a response to a challenge and a symmetric key;
- a step of receiving a white-box cryptography module constituting a white-box implementation of the cryptographic module of said server for said symmetric key, said white-box cryptography module being configured to encrypt or decrypt a message from said symmetric key buried in this module and input parameters comprising a message and a response to a challenge.

Correlatively, the Invention Relates to a Terminal Comprising:

- a module for sending an identifier of the terminal to a server comprising a cryptographic module configured to encrypt or decrypt a message based on input parameters comprising said message, a response to a challenge and a symmetric key;
- a module for receiving a white-box cryptography module constituting a white-box implementation of the cryptographic module of said server for said symmetric key, said white-box cryptography module being configured to encrypt or decrypt a message from said symmetric key buried in this module and input parameters comprising a message and a response to a challenge.

The invention thus proposes a secure mechanism for exchanging data between a server and a terminal in which the cryptographic functions of encryption and/or decryption of the terminal are implemented according to a white-box cryptography mechanism.

Thus, the symmetric key used by the terminal for the implementation of the cryptographic functions of encryption and/or decryption is not stored in a memory of the terminal but hidden in the code of the white-box cryptography module generated by the server for this terminal.

The symmetric key cannot therefore be obtained by a malicious third party who would attack or spy on the terminal during its execution.

The invention is therefore particularly suitable when the terminals are mobile terminals, connected objects or any device vulnerable to attacks, in particular to viruses.

For more information on the concept of white-box cryptography, the person skilled in the art can refer to the document "Understanding White-Box Cryptography, white paper", published at the address: https://www2.gemalto.com/email/2012/SRM/whitebox/public/pdf/WP_Whitebox_Cryptography_FR_A4_v4_web_1_.pdf.

In accordance with the invention, the cryptographic module implemented by the server is not implemented in a white box, such a server being sufficiently secure and less exposed to attacks which would aim at fraudulently obtaining the symmetric key. This server is said to be trusted. This characteristic allows faster execution of server-side cryptographic functions.

In one embodiment of the invention, the method for obtaining a white-box cryptography module implemented by the terminal further comprises:

a step of obtaining at least one challenge/response pair, of sending said at least one challenge/response pair to said server, said response being obtained from said challenge and from a probabilistic function implementing a physical unclonable function of the terminal.

In this embodiment of the invention, the method for providing a white-box cryptography module implemented by the server comprises a step of receiving and recording at least one challenge/response pair from said terminal.

It is recalled that a physical unclonable function of the terminal is a characteristic of a hardware component of the terminal which allows to uniquely differentiate an instance of a terminal from other terminals of the same brand, of the same model, produced in the same time. It is indeed difficult to manufacture a terminal with the same characteristics as another terminal.

In a particular embodiment, the physical unclonable function of a terminal can consist of a camera of the terminal. Such a camera indeed necessarily induces imperfections or noise in the images it produces, due to the characteristics of the sensor, for example the photodiodes of this sensor.

Other physical functions of the terminal can be considered. According to a first example, sensors of the terminal other than the camera can be used, such as a gyroscope, an accelerometer, a microphone, etc. According to a second example, this physical unclonable function can be implemented by an electronic chip integrated into the terminal.

It is emphasized here that the physical unclonable function is attached to the characteristics of the terminal and is specific to the terminal.

The invention thus proposes using an unclonable function of the terminal to generate challenge/response pairs, these pairs allowing the terminal in particular to provide the server with proof that it is indeed a terminal known to the server. The response to the challenge corresponds to a secret shared between the enrolled terminal and the server and only the enrolled terminal is able to determine it based on a challenge.

The invention also proposes using the challenge/response pairs thus obtained in the cryptographic mechanisms for encryption/decryption of the messages exchanged between the terminal and the server.

The invention thus relates to a method for encrypting a message implemented by a terminal, this method comprising:

a step of obtaining a white-box cryptography module from a server, said white-box cryptography module being configured to encrypt or decrypt a message from a symmetric key specific to the terminal and buried in this module and input parameters comprising a message and a response to a challenge, a step of obtaining a response to a challenge by implementing a probabilistic function implementing a physical unclonable function of the terminal; and a step of sending to said server the message encrypted by said white-box cryptography module according to the response to the challenge.

Similarly, the invention relates to a method for decrypting an encrypted message received from a terminal, this method being implemented by a server and comprising:

a step of sending a challenge to the terminal and receiving from the terminal an encrypted message by means of a white-box cryptography module provided by said server, this white-box cryptography module being a white-box implementation of a cryptographic module of said server for a symmetric key of the terminal, said white-box cryptography module being configured by the server to encrypt or decrypt a message based on input parameters comprising a message and a response to a challenge, and on said symmetric key buried in said white-box cryptography module, said response received from the terminal corresponding to a response of a challenge/response pair received from the terminal in a prior enrollment phase;

a decryption step implemented by providing said symmetric key, the response to the challenge and the encrypted message at the input of the cryptographic module of said server, the result of said decryption step comprising a message in plain text.

Similarly, the invention also relates to a method for encrypting a message implemented by a server, said encrypted message being intended to be sent to a terminal, this method comprising:

a data encryption step comprising obtaining a symmetric key from said terminal and a response to a challenge, received from said terminal during a terminal enrollment phase, during which the server has generated and provided to the terminal a white-box cryptography module, said white-box cryptography module being a white-box implementation of a cryptographic module of the server for said symmetric key, said white-box cryptography module being configured to encrypt or decrypt a message based on input parameters comprising a message, a response to a challenge, and said symmetric key buried in said white-box cryptography module, said response received from the terminal corresponding to a response from a challenge/response pair;

an encryption step implemented by providing at the input of the cryptographic module of said server said symmetric key, said response and said message; and a step of sending the challenge and an encrypted message obtained to said terminal.

Similarly, the invention also relates to a method for decrypting an encrypted message implemented by a terminal, this method comprising:

a step of obtaining a white-box cryptography module from a server, said white-box cryptography module being configured to encrypt or decrypt a message from a symmetric key specific to the terminal and buried in this module and input parameters comprising a message and a response to a challenge, a step of receiving, from said server, a challenge and an encrypted message;

a step of obtaining a response to the challenge received by implementing a probabilistic function implementing a physical unclonable function of the terminal;

a step of decrypting the message encrypted by said white-box cryptography module to obtain said message in plain text.

In a particular embodiment, the various steps of the methods mentioned above are determined by computer program instructions.

Consequently, the invention also relates to a computer program on an information medium, this program being capable of being implemented in a server or more generally in a computer, this program comprising instructions adapted to the implementation of the steps of a method for providing a white-box cryptography module as presented above.

The invention also relates to a computer program on an information medium, this program being capable of being implemented in a terminal or more generally in a computer, this program comprising instructions adapted to the implementation of the steps a method for obtaining a white-box cryptography module as presented above.

The invention also relates to a computer program on an information medium, this program being capable of being implemented in a server, in a terminal or more generally in a computer, this program comprising instructions adapted to the implementation of the steps of an encryption method or of a decryption method as presented above.

These programs may use any programming language, and be in the form of source code, object code, or intermediate code between source code and object code, such as in a partially compiled form, or in any other desirable form.

The invention also relates to an information or recording medium readable by a computer, and comprising instructions of a computer program as mentioned above.

The information or recording medium can be any entity or device capable of storing the program. For example, the medium may comprise a storage means, such as a ROM, for example a CD ROM or a microelectronic circuit ROM, or else a magnetic recording means, for example a hard disk.

On the other hand, the information or recording medium can be a transmissible medium such as an electrical or optical signal, which can be conveyed via an electrical or optical cable, by radio or by other means. The program according to the invention can in particular be downloaded from an Internet-type network.

Alternatively, the information or recording medium may be an integrated circuit in which the program is incorporated, the circuit being adapted to execute or to be used in the execution of the method in question.

Other characteristics and advantages of the present invention will become apparent from the description given below, with reference to the appended drawings which illustrate an exemplary embodiment devoid of any limiting character. In the FIGURES:

FIG. 1 shows a terminal and a server in accordance with the invention, in their environment;

FIG. 2 functionally shows a server in accordance with a particular embodiment of the invention;

Figure 2:
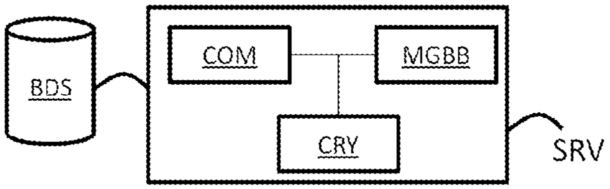
Figure 4:
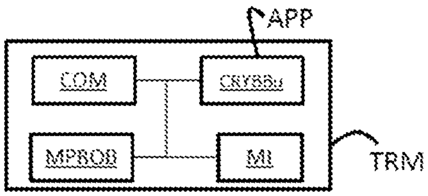
Figure 5A:
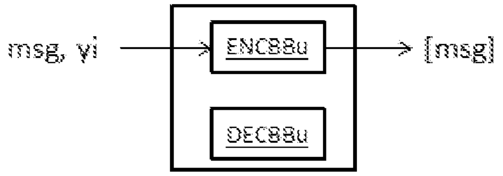
Figure 5B:
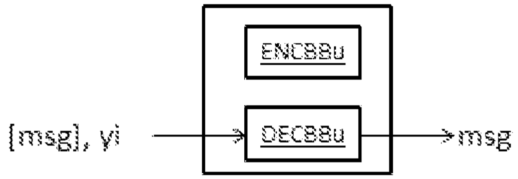
Figure 6:
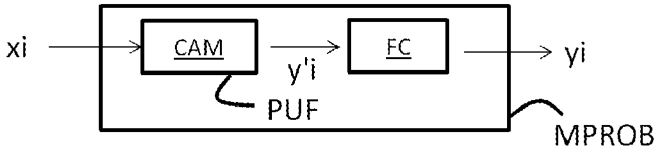
Figure 8A:
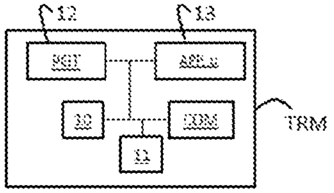
Figure 8B:
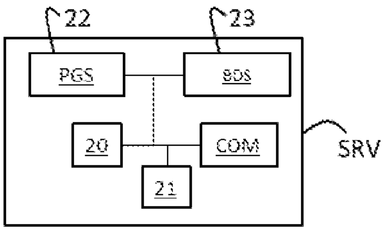
Figure 7:
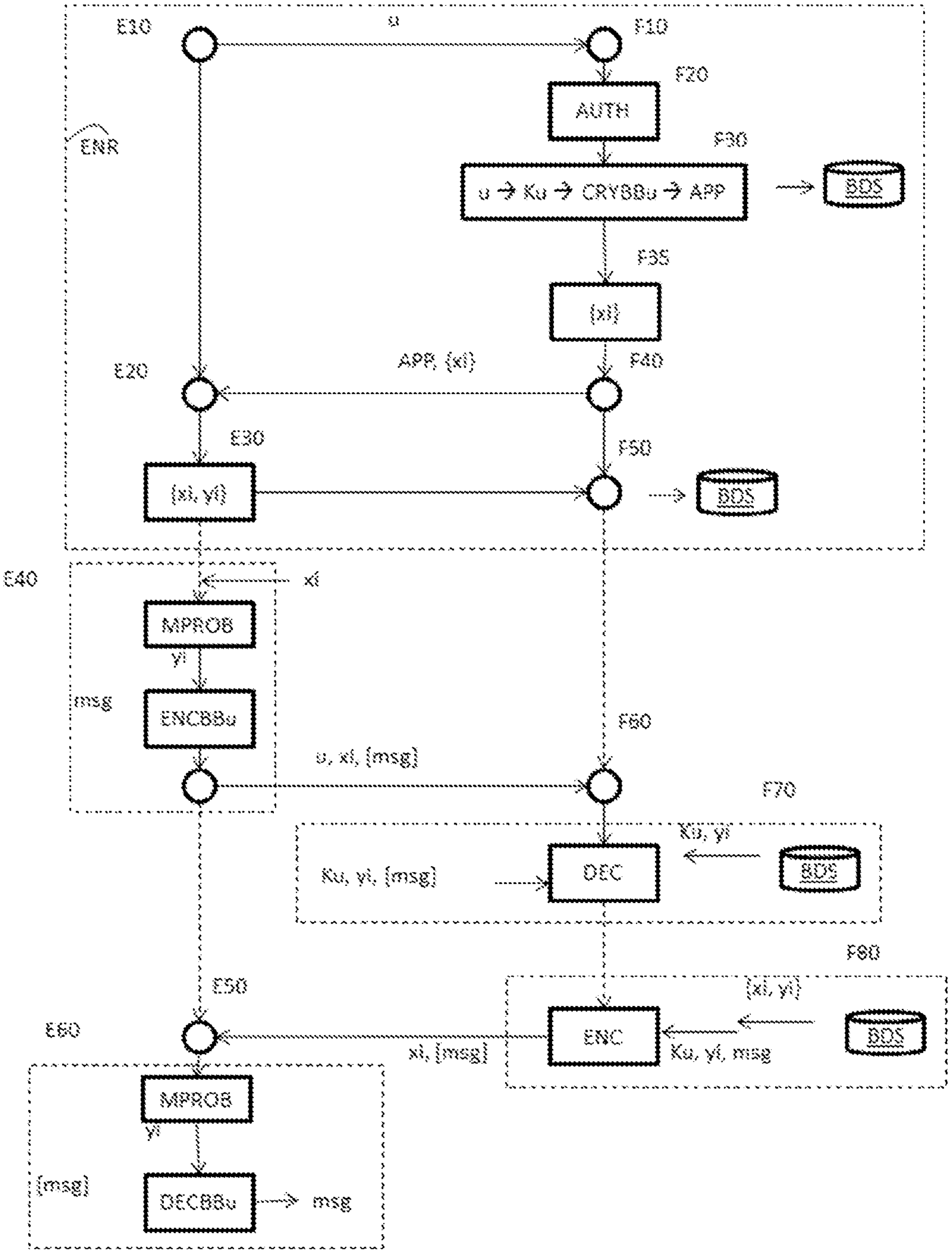

FIG. 4 functionally shows a terminal in accordance with a particular embodiment of the invention;

FIG. 5A shows a first use of a white-box cryptography module that can be implemented in the terminal of FIG. 4;

FIG. 5B shows a second use of a white-box cryptography module that can be implemented in the terminal of FIG. 4;

FIG. 6 shows an example of a probabilistic module comprising an unclonable function and that can be implemented in the terminal of FIG. 4;

FIG. 7 shows in the form of a flowchart of the encryption and decryption methods a method that can be implemented by the terminal of FIG. 4 and by the server of FIG. 2, these methods being in accordance with particular embodiments of the invention;

FIG. 8A is a hardware representation of a terminal in accordance with a particular embodiment of the invention; and FIG. 8B is a hardware representation of a server in accordance with a particular embodiment of the invention.

Figure 1:
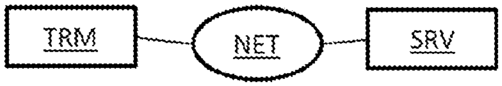

FIG. 1 shows a terminal TRM in accordance with a particular embodiment of the invention and a server SRV in accordance with a particular embodiment of the invention in their environment, able to communicate via a telecommunications network NET, to exchange messages securely, using a symmetric key cryptographic mechanism.

In the embodiment described here, and as shown in FIG. 2, the server SRV comprises a communication module COM and a cryptographic module CRY.

Figure 3A:
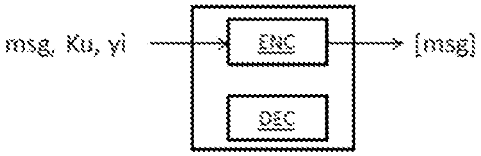
FIG. 3A shows a first use of a cryptographic module that can be implemented in the server of FIG. 2.
Figure 3B:
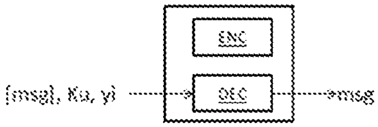
FIG. 3B shows a second use of a cryptographic module that can be implemented in the server of FIG. 2.

In the embodiment described, and as shown in FIGS. 3A and 3B, the cryptographic module CRY of the server SRV comprises:

- an encryption module ENC, configured to obtain, depending on a challenge, a response to this challenge and to encrypt with a symmetric key Ku received at the input of this module, a message msg in plain text received at the input of this module, and the response to the challenge, the encrypted message being denoted [msg]; and
- a decryption module DEC, configured to obtain, based on a challenge, a response to this challenge and to decrypt with the symmetric key Ku received at the input of this module, an encrypted message [msg] received at the input of this module, the decrypted message being denoted msg.

Alternatively, the cryptographic module CRY could be configured to implement only decryption functions or only encryption functions and only comprise the corresponding module DEC or ENC.

In the Embodiment Described Here, and as Shown in FIG. 4, the Terminal TRM Comprises:

- a communication module COM compatible with the communication module COM of the server SRV; and
- a white-box cryptography module CRYBBu.

In the embodiment described, and as shown in FIGS. 5A and 5B, the white-box cryptography module CRYBBu of the terminal TRM comprises:

- a white-box encryption module ENCBBu, to obtain a response to this challenge based on a challenge and to encrypt, according to the response to the challenge and the symmetric key Ku, a message msg received at the input of this module, the encrypted message being denoted [msg]; and
- a white-box decryption module DECBBu, to obtain a response to this challenge based on a challenge and to decrypt with the symmetric key Ku and the response to the challenge an encrypted message [msg] received at the input of this module, the decrypted message being denoted msg.

In accordance with white-box cryptographic mechanisms, the symmetric key Ku is not received at the input of the cryptographic module CRYBBu but buried secretly in this module. Secretly buried means that this symmetric key is not accessible by a malicious third party who would attack or spy on the terminal during the execution of encryption or decryption operations.

The cryptographic module CRYBBu constitutes a white-box implementation of the cryptographic module CRY of the server SRV, for the symmetric key Ku. In other words, and for example:

- an encrypted message [msg] obtained by the module CRY of the server when it takes as input the symmetric key Ku, a response to a challenge and a given message msg; and
- the message [msg] obtained by the cryptographic module CRYBBu when it takes as input this same message msg and a response to this challenge The white-box cryptography module CRYBBu could be configured to implement only decryption functions or only encryption functions and only comprise the corresponding white-box module DECBBu or ENCBBu.

The communication means COM of the server SRV and of the terminal TRM are adapted to allow the terminal TRM to send an identifier u of this terminal to the server SRV to authenticate itself with this server.

In the embodiment described here, and as shown in FIG. 2, the server SRV comprises a module MGBB configured to:

- generate a symmetric key Ku for the terminal TRM upon receiving the identifier u of this terminal;
- generate the white-box cryptography module CRYBBu for this key Ku.

The communication means COM of the server SRV and the terminal TRM are adapted to allow the terminal SRV to send the white-box cryptography module CRYBBu to the terminal TRM, either as it is, or integrated into an application APP.

In the embodiment described here, the terminal TRM comprises an installation module MI configured to be able to install the cryptographic module CRYBBu or the application APP in a rewritable non-volatile memory of this terminal.

As represented in FIG. 4, the terminal TRM comprises a probabilistic module MPROB which will now be described with reference to FIG. 6.

This probabilistic module MPROB comprises a physical unclonable function PUF.

In the Embodiment Described Here, this Probabilistic Module MPROB is Configured to:

- receive a variable parameter at the input, that is to say a challenge xi;
- calculate an answer to this challenge yi.

In the exemplary embodiment described here, this physical function is a terminal camera. It has hardware characteristics specific to the terminal TRM.

In the Embodiment Described Here, this Probabilistic Module MPROB is Configured to:

- receive a variable parameter at the input, for example an exposure time xi corresponding to the challenge;
- acquire an image with the PUF camera for the exposure time xi;
- calculate a signature y'i of this image.

In a particular embodiment, it is possible that the signature y'i is noisy and that for images acquired with the same exposure duration xi, different signatures y'ij are obtained. In this embodiment, the probabilistic module MPROB comprises a corrective filter FC configured to generate a signature yi, that is to say a response to the challenge xi, from the noisy signature y'i, this signature yi being identical for noisy signatures y'ij obtained for the same exposure time xi. In a particular embodiment, this filter FC is secret and specific to the terminal TRM. Thus the secret denoising allows to increase the security of message encryption and decryption.

The probabilistic module MPROB is configured to output the non-noisy signature yi, as a response to the challenge xi.

In the embodiment described here, the noisy signature y'i is an imprint of a dark signal known per se by the person skilled in the art of photographic sensors.

In the embodiment described here, the non-noisy signature yi is obtained by projecting the noisy signature y'i onto a binary sequence, as known by a person skilled in the art of coding.

Other physical functions of the terminal can be considered. This involves, for example, using other sensors of a terminal, such as a gyroscope, an accelerometer, a microphone, etc. It can also be an electronic chip integrated into the terminal implementing this physical unclonable function.

It is recalled that the physical unclonable function is attached to the characteristics of the terminal and is specific to the terminal.

It is now assumed that the user of the terminal TRM wishes to subscribe, with the server SRV, to a service implementing a secure data exchange mechanism in accordance with the invention, for example a payment service.

During a step E10, and as represented in FIG. 7, the terminal TRM registers with the server SRV by providing it with its identifier u. This identifier is received by the server SRV during a step F10.

In the embodiment described here, the server SRV authenticates the user during a step F20.

If the Authentication Succeeds, During a Step F30, the Server SRV:

- generates a symmetric key Ku for the terminal TRM;
- saves this symmetric key Ku in association with the identifier u of the terminal TRM in a database BDS;
- generates a white-box cryptography module CRYBBu for this symmetric key Ku; and
- integrates this white-box cryptography module CRYBBu into an application APP adapted to the desired service, in this case the secure payment service.

During a step F35, the server SRV, which acts as a trusted third party, obtains a set of challenges xi randomly.

In the embodiment described here, the server SRV sends the application APP and the set of challenges xi to the terminal TRM during the same step F40. The terminal TRM receives them during a step E20.

During a step E30, the terminal TRM generates a response yi for each challenge xi received from the trusted third-party server SRV by using the probabilistic function MPROB. It thus forms challenge/response pairs {xi, yi}.

In the exemplary embodiment described here, a response yi is obtained based on the challenge, the associated response yi being the non-noisy signature obtained by the probabilistic module MPROB for this input parameter xi.

In the embodiment described here, the terminal TRM sends the {challenge, response} pairs to the server SRV during this same step E30. They are received by the server SRV and recorded in the database BDS during a step F50.

It is underlined here that the {challenge, response} pairs are not stored in a memory of the terminal TRM.

Steps E10 to E30 and F10 to F50 constitute an enrollment phase referenced ENR in FIG. 7.

It is assumed that the terminal wants to securely send a message msg to the server SRV.

During a Step E40, the Terminal:

- receives a challenge xi from the server SRV;
- uses the probabilistic module MPROB to calculate the response yi to this challenge. In the embodiment described here, this operation consists in taking an image with the exposure time xi, calculating a noisy signature y'i of the dark signal of this image, and obtaining the challenge yi by projection of the noisy signature y'i on a binary string;
- uses the white-box encryption module ENCBBu to encrypt the message msg according to the response yi in order to obtain the encrypted message [msg]; and
- sends to the server SRV its identifier u, the challenge xi and the encrypted message [msg].

Optionally, the challenge xi is not sent to the server SRV.

These data are received by the server SRV during a step F60.

During a step F70, the server SRV obtains the symmetric key Ku in its database BDS from the identifier u. It obtains from its database BDS the answer yi corresponding to the challenge xi. It decrypts the encrypted message [msg] using its decryption module DEC according to the symmetric key Ku and the answer yi and recovers a message. If yi indeed corresponds to the value used by the terminal, then the message retrieved corresponds to the message msg in plain text.

It is assumed that the server SRV wishes to send a message msg to the terminal TRM in a secure manner.

During a Step F80, the Server SRV:

- chooses a pair {xi, yi} in its database BDS;
- uses the encryption module ENC to encrypt the message msg using the symmetric key Ku of the terminal TRM and the response yi; the result of this encryption being the encrypted message [msg];
- sends the challenge xi and the encrypted message [msg] to the terminal TRM.

These data are received by the terminal TRM during a step E50.

During a Step E60, the Terminal TRM:

- uses the probabilistic module (MPROB) to calculate the answer yi to the challenge xi;
- decrypts the encrypted message [msg] using the white-box decryption module DECBBu and obtains the message msg.

If yi calculated by the probabilistic module corresponds to the value used by the server, then the decrypted message corresponds to the message msg in plain text.

FIG. 8A shows the terminal TRM of FIG. 1.

In the embodiment described here, this terminal TRM has the architecture of a computer. It comprises in particular a processor 10, a random access memory of the RAM type 11, a read only memory of the ROM type 12, a rewritable non-volatile memory of the FLASH type 13 and communication means COM.

In the embodiment described here, the application APP is stored in the non-volatile memory 13. The instructions of this application and in particular those of the white-box cryptography module CRYBBu are executed by the processor 10.

In this embodiment, the non-volatile memory 13 also stores the identifier u of the terminal.

The read only memory 12 constitutes a recording medium in accordance with the invention. It comprises a computer program PGT in accordance with the invention. This program PGT comprises in particular instructions for, when they are executed by the processor 10:

- communicating with the server SRV using the communication module COM;
- receiving a challenge xi and calculating a response to this challenge, for example controlling the PUF camera to take images with an exposure time xi, calculating a signature of the image obtained, filtering it to obtain a response yi and sending the challenges/responses pairs {xi, yi} to the server SRV;
- invoking the white-box cryptography module CRYBBu to encrypt or decrypt messages according to a response to a challenge.

FIG. 8B shows the server SRV of FIG. 1.

In the embodiment described here, this server SRV has the architecture of a computer. It comprises in particular a processor 20, a random access memory of the RAM type 21, a read only memory of the ROM type 22, a rewritable non-volatile memory of the FLASH type 23 and communication means COM.

In this embodiment, the non-volatile memory 23 also stores the database BDS.

The read only memory 22 constitutes a recording medium in accordance with the invention. It comprises a computer program PGS in accordance with the invention. This program PGS comprises in particular instructions for, when they are executed by the processor 20:

- communicating with the terminal TRM using the communication module COM;
- generating symmetric keys Ki, white-box cryptography modules CRYBBu for these keys and integrating these modules into applications for different services;
- storing for a terminal TRM in a database BDS a set of pairs {xi, yi} associated with this terminal;
- invoking the cryptographic module CRY to encrypt or decrypt messages according to a response yi associated with a challenge xi.

The invention claimed is:

1. A method for exchanging messages between a server and a terminal by providing a white-box cryptography module, each of the server and the terminal comprising a processor and a memory, the method implemented by the server, the server further comprising a cryptographic module configured to encrypt or decrypt a message based on input parameters comprising said message, a symmetric key and a response to a challenge, the method comprising:

- obtaining a symmetric key for the terminal;
- receiving and recording at least one challenge/response pair from said terminal, said response being obtained from said challenge and from a probabilistic function implementing a physical unclonable function of the terminal, said terminal having received a variable parameter corresponding to the challenge, said parameter being an exposure time xi corresponding to the challenge, acquired an image with a camera of the terminal for the exposure time xi, the camera implementing the physical unclonable function of the terminal, and calculated a signature of the image which corresponds to the response of the challenge;
- generating a white-box cryptography module with said symmetric key buried inside said white-box cryptography module, said white-box cryptography module being a white-box implementation of the cryptographic module of the server for said symmetric key obtained for this terminal, said white-box cryptography module being configured to encrypt or decrypt a message from said symmetric key which is buried in this module and input parameters comprising a message and a response to a challenge;
- providing said white-box cryptography module with said symmetric key buried inside said white-box cryptography module, to said terminal; and
- communicating with the terminal by using the symmetric key.

2. The method of claim 1, wherein the symmetric key used by the terminal is not stored in a memory of the terminal, the symmetric key being hidden in a code of the white-box cryptography module generated by the server.

3. A method for encrypting a message implemented by a server, said encrypted message being intended to be sent to a terminal, each of the server and the terminal comprising a processor and a memory, said method comprising:

- a data encryption step comprising obtaining a symmetric key from said terminal and a response to a challenge, said response being obtained from said challenge and from a probabilistic function implementing a physical unclonable function of the terminal, said terminal having received a variable parameter corresponding to the challenge, said parameter being an exposure time xi corresponding to the challenge, acquired an image with a camera of the terminal for the exposure time xi, the camera implementing the physical unclonable function of the terminal, and calculated a signature of the image which corresponds to the response of the challenge, the response being received from said terminal during a terminal enrollment phase, during which the server has generated and provided to the terminal a white-box cryptography module, said white-box cryptography module being a white-box implementation of a cryptographic module of the server for said symmetric key, said white-box cryptography module being configured to encrypt or decrypt a message based on input parameters comprising a message, a response to a challenge, and said symmetric key which is buried in said white-box cryptography module, said response received from the terminal corresponding to a response of a challenge/response pair;

an encryption step implemented by providing at the input of the cryptographic module of said server said symmetric key, said response and said message; and sending the challenge and an encrypted message obtained to said terminal.

4. A method for decrypting an encrypted message implemented by a server, the server comprising a processor and a memory, said method comprising:

sending a challenge to a terminal and receiving from the terminal an encrypted message by means of a white-box cryptography module provided by said server, this white-box cryptography module being a white-box implementation of a cryptographic module of said server for a symmetric key of the terminal, said white-box cryptography module being configured by the server to encrypt or decrypt a message based on input parameters comprising a message and a response to a challenge, and on said symmetric key which is buried in said white-box cryptography module, said response received from the terminal corresponding to a response of a challenge/response pair received from the terminal in a prior enrollment phase; and a decryption step implemented by providing said symmetric key, the response to the challenge and the encrypted message at the input of the cryptographic module of said server, the result of said decryption step comprising a message in plain text, said response being obtained from said challenge and from a probabilistic function implementing a physical unclonable function of the terminal, said terminal having received a variable parameter corresponding to the challenge, said parameter being an exposure time xi corresponding to the challenge, acquired an image with a camera of the terminal for the exposure time xi, the camera implementing the physical unclonable function of the terminal, and calculated a signature of the image which corresponds to the response of the challenge.

5. A server comprising a processor and a memory, the server comprising:

a cryptographic module configured to encrypt or decrypt a message based on input parameters comprising said message, a response to a challenge and a symmetric key, said response corresponding to a response of a challenge/response pair and being obtained from said challenge and from a probabilistic function implementing a physical unclonable function of the terminal, a terminal having received a variable parameter corresponding to the challenge, said parameter being an exposure time xi corresponding to the challenge, acquired an image with a camera of the terminal for the exposure time xi, the camera implementing the physical unclonable function of the terminal, and calculated a signature of the image which corresponds to the response of the challenge;

a module for obtaining a symmetric key for said terminal;

a module for generating a white-box cryptography module comprising the symmetric key buried inside, said white-box cryptography module being a white-box implementation of said cryptographic module of the server for said symmetric key obtained for this terminal, said white-box cryptography module being configured to encrypt or decrypt a message from said symmetric key which is buried in this module and input parameters comprising a message and a response to a challenge;

a module for providing said white-box cryptography module to said terminal, with said symmetric key buried inside said white-box cryptography module; and communication means adapted to communicate with the terminal by using the symmetric key.

6. A method for exchanging messages between a server and a terminal by obtaining a white-box cryptography module, the method implemented by the terminal comprising a processor and a memory, the method comprising:

obtaining at least one challenge/response pair and sending said at least one challenge/response pair to said server, said response being obtained from said challenge and from a probabilistic function implementing a physical unclonable function of the terminal by receiving a variable parameter corresponding to the challenge, this parameter being an exposure time xi, acquiring an image with a camera of the terminal for the exposure time xi, the camera implementing the physical unclonable function of the terminal, and calculating a signature of the image which corresponds to the response of the challenge;

sending an identifier of the terminal to a server comprising a cryptographic module configured to encrypt or decrypt a message based on input parameters comprising said message, said response to the challenge and a symmetric key;

receiving a white-box cryptography module with said symmetric key buried inside, the white-box cryptography module constituting a white-box implementation of the cryptographic module of said server for said symmetric key, said white-box cryptography module being configured to encrypt or decrypt a message from said symmetric key which is buried in this module and input parameters comprising a message and a response to a challenge; and communicating with the server by using the symmetric key of the white-box cryptography module.

7. A method for encrypting a message, the method implemented by a terminal comprising a processor and a memory, said method comprising:

obtaining a white-box cryptography module from a server, said white-box cryptography module being configured to encrypt or decrypt a message from a symmetric key specific to the terminal which is buried in this module and from input parameters comprising a message and a response to a challenge;

obtaining a response to a challenge by implementing a probabilistic function implementing a physical unclonable function of the terminal by receiving a variable parameter corresponding to the challenge, this parameter being an exposure time xi, acquiring an image with a camera of the terminal for the exposure time xi, the camera implementing the physical unclonable function of the terminal, and calculating a signature of the image which corresponds to the response of the challenge; and sending to said server the message encrypted by said white-box cryptography module with said symmetric key buried inside according to the response to the challenge.

8. A method for decrypting an encrypted message, the method implemented by a terminal, comprising a processor and a memory, said method comprising:

obtaining a white-box cryptography module from a server, said white-box cryptography module being configured to encrypt or decrypt a message from a symmetric key specific to the terminal which is buried in this module and from input parameters comprising a message and a response to a challenge;

receiving, from said server, a challenge and an encrypted message;

obtaining a response to the challenge received by implementing a probabilistic function implementing a physical unclonable function of the terminal by receiving a variable parameter corresponding to the challenge, this parameter being an exposure time xi, acquiring an image with a camera of the terminal for the exposure time xi, the camera implementing the physical unclonable function of the terminal, and calculating a signature of the image which corresponds to the response of the challenge; and decrypting the message encrypted by said white-box cryptography module with said symmetric key buried inside to obtain said message in plain text.

9. A terminal comprising a processor, a camera, and a memory, the terminal comprising:

a module for receiving a variable parameter corresponding to a challenge, said variable parameter being an exposure time xi, and for sending at least one challenge/response pair to a server, said response being obtained from said challenge and from a probabilistic function implementing a physical unclonable function of the terminal, the camera implementing the physical unclonable function for acquiring an image with the camera of the terminal for the exposure time xi and calculating a signature of the image which corresponds to the response of the challenge;

a module for sending an identifier of the terminal to a server comprising a cryptographic module configured to encrypt or decrypt a message based on input parameters comprising said message, a response to a challenge and a symmetric key;

a module for receiving a white-box cryptography module with said symmetric key buried inside, the white-box cryptography module constituting a white-box implementation of the cryptographic module of said server for said symmetric key, said white-box cryptography module being configured to encrypt or decrypt a message from said symmetric key buried in this module and input parameters comprising a message and a response to a challenge; and communication means adapted to communicate with the server by using the white-box cryptography module with said symmetric key buried inside.

* * * * *